Aug. 23, 1927.
A. D. GALLAGHER
CULTIVATOR
Filed July 23, 1924
1,639,768
5 Sheets-Sheet 3
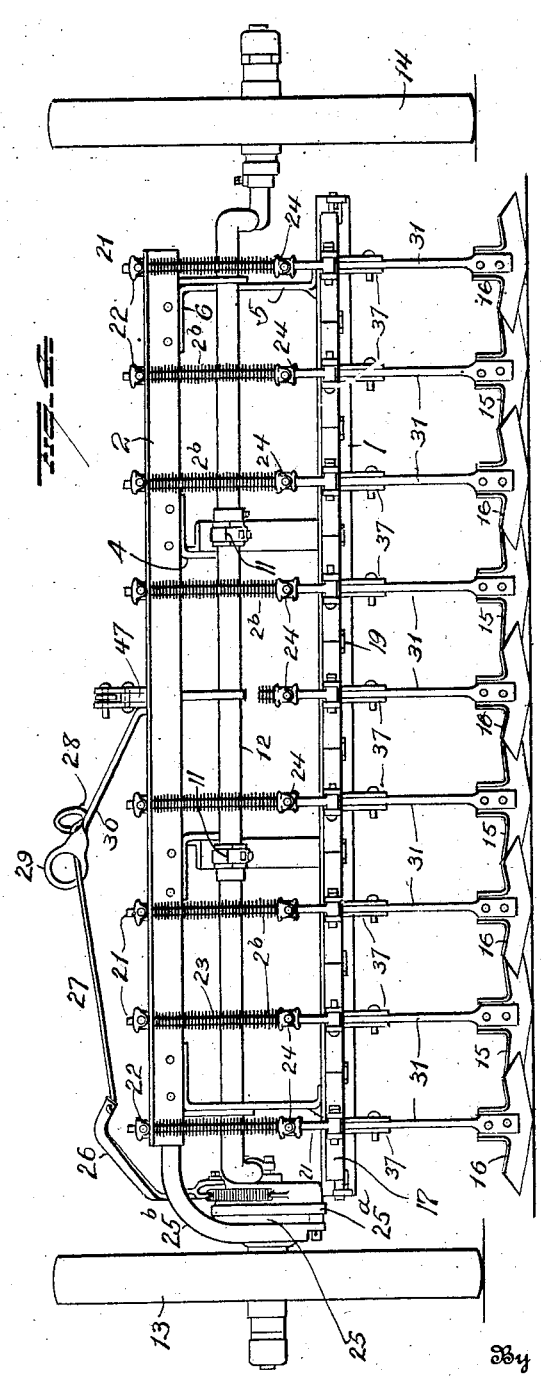
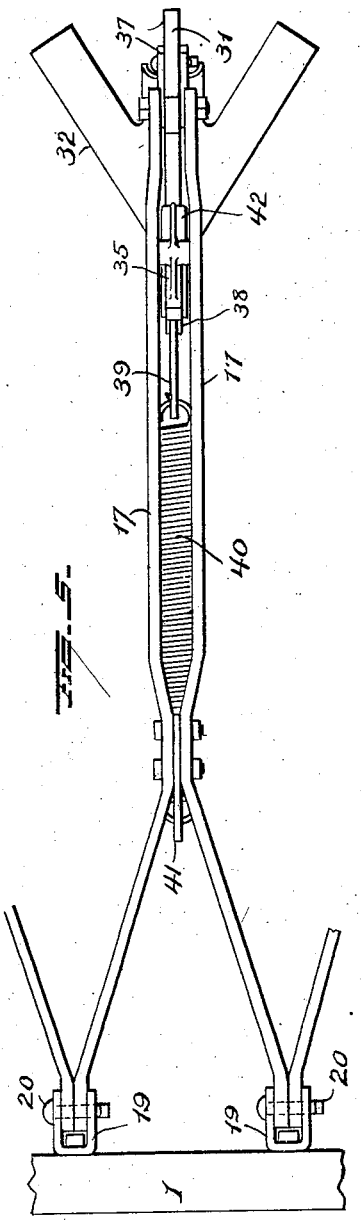
Inventor
A. D. Gallagher
By Seymour & Bright
Attorneys

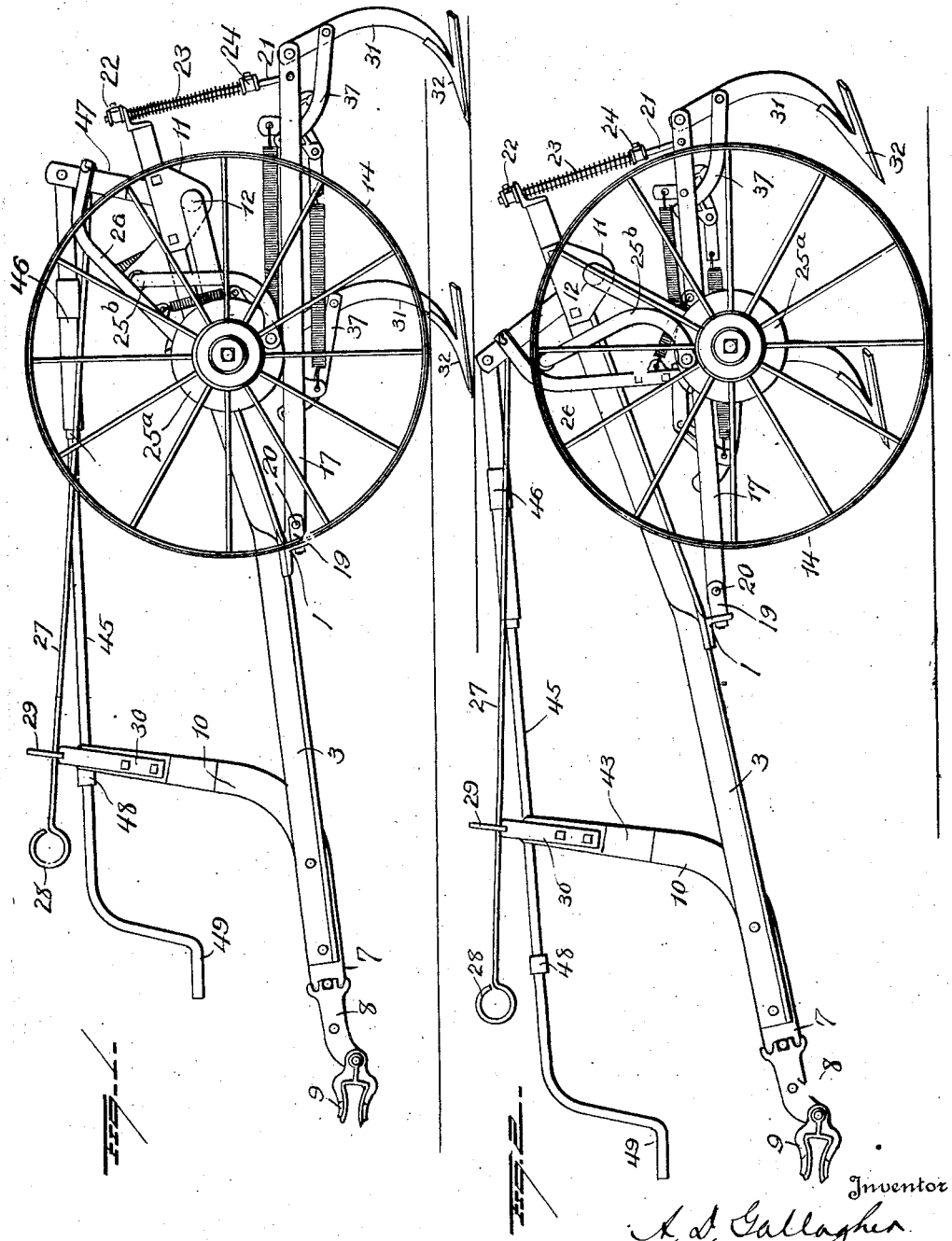

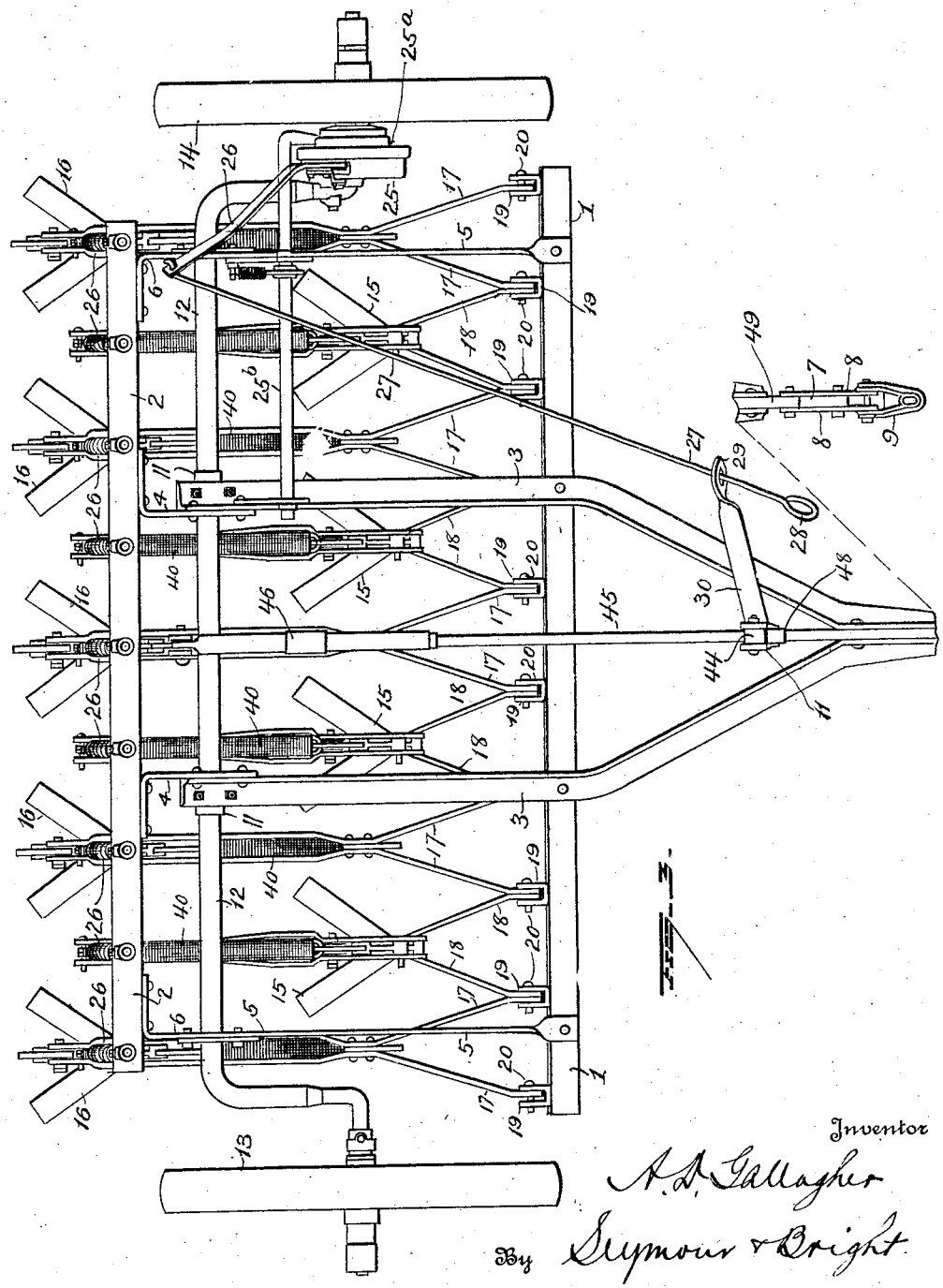

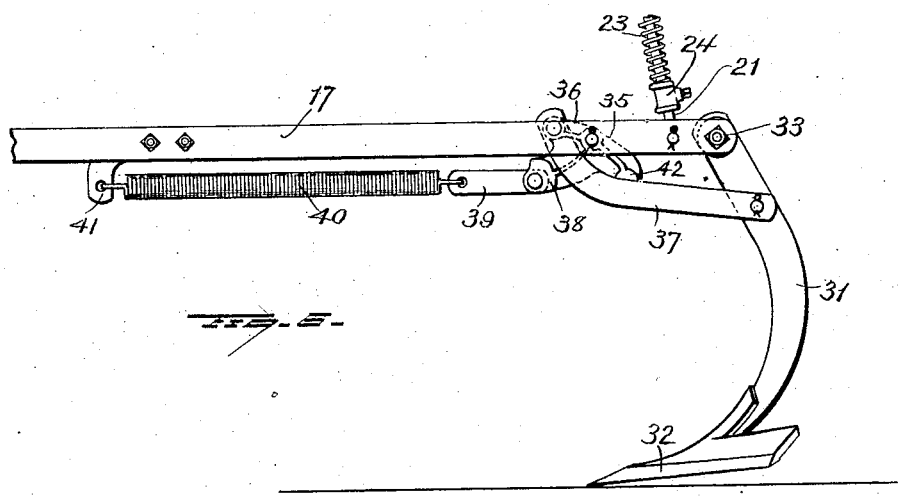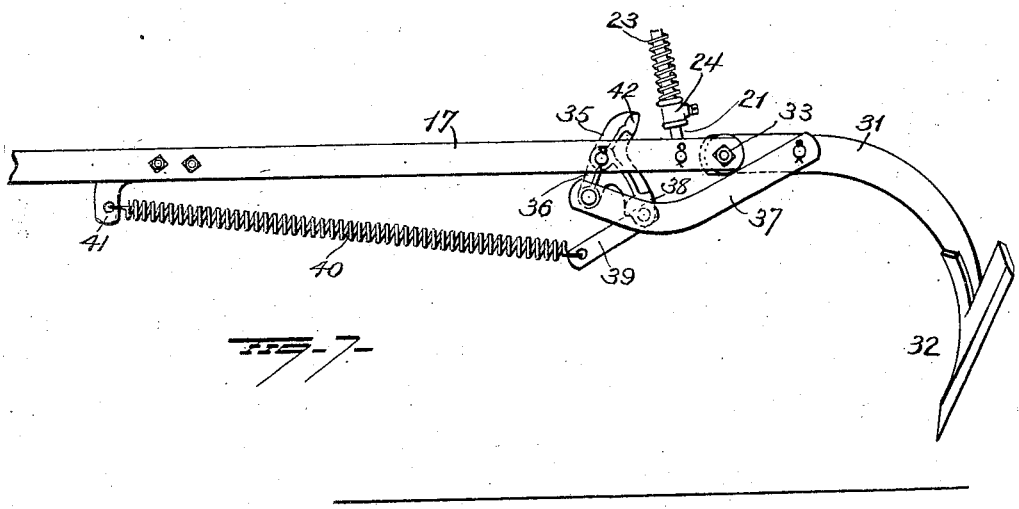

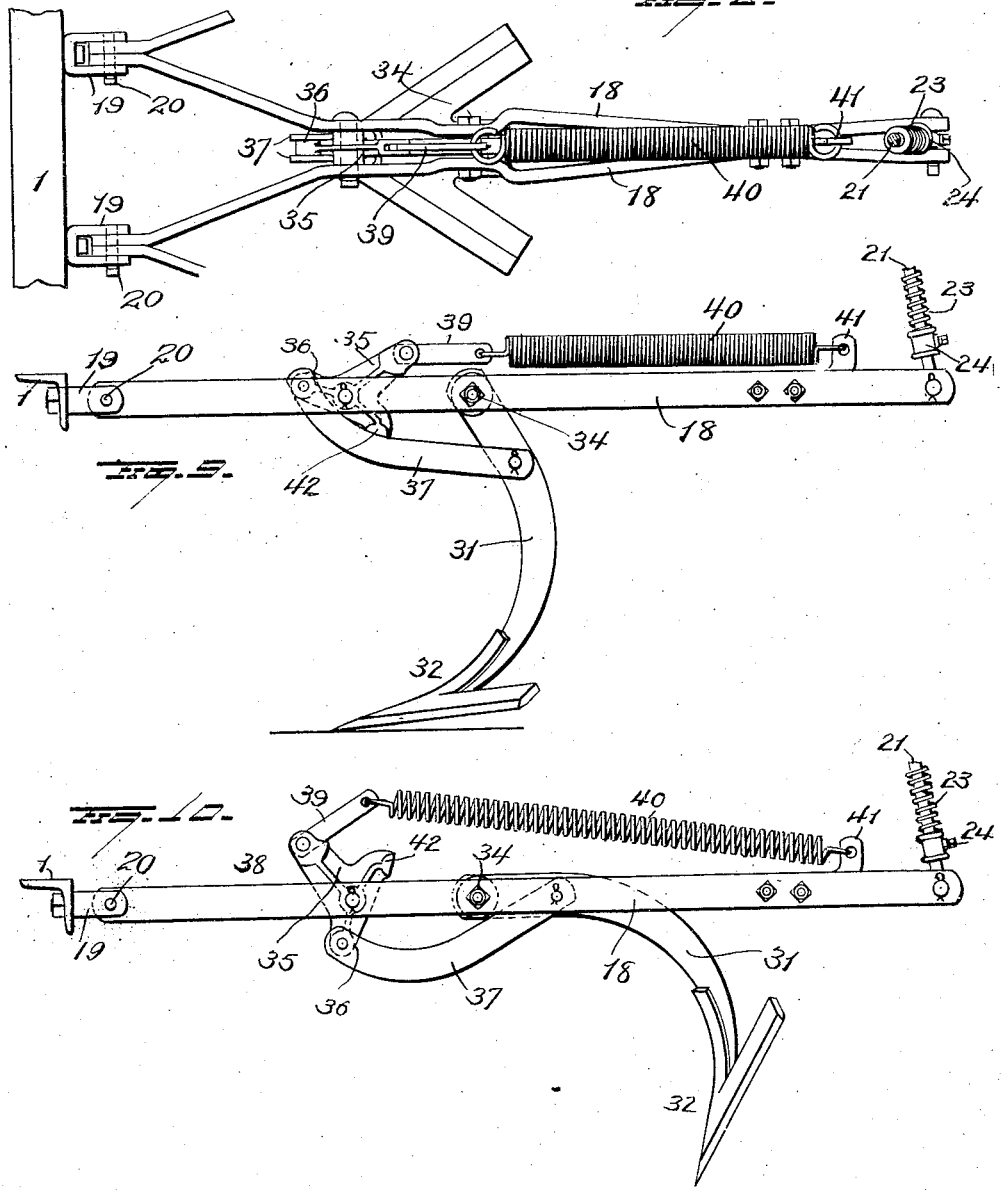

Patented Aug. 23, 1927.

1,639,768

UNITED STATES PATENT OFFICE.

ARTHUR D. GALLAGHER, OF SOUTH BEND, INDIANA, ASSIGNOR TO OLIVER CHILLED PLOW WORKS, OF SOUTH BEND, INDIANA.

CULTIVATOR.

Application filed July 23, 1924. Serial No. 727,743.

This invention relates to improvements in cultivators and has reference to those of the wheeled type,—one object of the invention being to improve and simplify the construction of wheeled cultivators in various respects to the end that efficiency of operation shall be enhanced; that accurate control of the same from a tractor shall be rendered simple and sure, and that adequate strength of the structure shall be insured.

A further object is to so construct a cultivator that simple and efficient spring trip means shall be provided to permit the earth-working elements and their standards to yield in the event that undue resistance be offered to their forward travel.

A further object is to so construct and arrange a plurality of cultivator gangs having trip standards for the earth-working parts, that ample clearance shall be obtained without weakening the structure of the cultivator.

A further object is to provide a simple unitary frame structure adapted for reception of the various movable parts of the cultivator.

With these and other objects in view, the invention consists in certain novel features of construction and combinations of parts as hereinafter set forth and pointed out in the claims.

In the accompanying drawings,—

Figure 1 is a side elevation of a cultivator embodying my improvements, with the parts in the positions which they assume when the shovel gangs are in working position.

Figure 2 is a side elevation showing the positions of the parts when the shovel gangs are raised.

Figure 3 is a plan view of the cultivator.

Figure 4 is a rear view of the same.

Figure 5 is a plan view showing a unit of the rear shovel gang.

Figure 6 is a side elevation of said unit with the shovel and its standard in working position.

Figure 7 is a side elevation of the same unit showing positions of the parts when the shovel and its standard have been tripped, and Figures 8, 9 and 10 are views similar to Figures 5, 6 and 7 showing a unit of the front gang.

The cultivator embodies a unitary frame in which front and rear horizontal beams 1—2 are employed. To the front beam 1 at respective sides of the center thereof, longitudinal beams 3—3 are secured and the rear ends of these longitudinal beams are connected by means of brackets 4 with the rear beam 2 and in this manner the rear beam 2 is supported from the longitudinal beams 3. Near respective ends of the front beam 1, brace bars 5 are secured and the rear portions of these brace bars are connected with the rear horizontal beams 2 by means of brackets 6, all as clearly shown in Figure 3. The forward portions of the longitudinal frame beams 3 approach each other, and have secured between them a draw-bar 7 which projects forwardly from the convergent forward ends of the beams 3 and has adjustably secured to it, jaws 8 with which a clevis 9 is connected for attachment to a tractor. The draw-bar extends rearwardly from its connection with the frame beams 3 and is bent upwardly to form a standard 10 for a purpose hereinafter explained. Suitable bearings 11 are secured to the respective longitudinal beams 3 for the accommodation of a crank-axle 12 and on the spindles formed at the free ends of the cranks of said axle, carrying wheels 13—14 are loosely mounted.

The cultivator comprises forward and rear cultivator gangs 15 and 16 and each unit of each gang includes a beam portion comprising two members, the beam portions of the rear gang units being indicated at 17 and the beam portions of the front gang units being represented at 18. A plurality of U-shaped brackets 19 are suitably spaced apart and swiveled to the front horizontal frame beam 1 and in these brackets, the beam members of the front and rear gangs are pivotally connected by horizontal pivot pins 20 as shown in Figure 3. The rear portion of the beam of each gang unit of both gangs has pivoted thereto the lower end of a rod 21 and the upper ends of these several rods pass through perforations in the rear frame beam 2. Collars 22 are secured to the upper end portions of the rods 21 to rest upon the beam 2 and thus the rear portions of the gang units are supported. A coiled spring 23 encircles each rod 21 and bears at its ends respectively against the frame beam 2 and a collar 24 secured to said rod,—said spring serving as presser means for the gang unit.

Both shovel gangs may be raised simultaneously when the cultivator is to be transported from place to place, by means of power-lift mechanism operable from one of the carrying wheels. In the present instance, I have shown clutch mechanism indicated at 25 for connecting the carrying wheel 14 with the frame through the medium of lifting members 25$^a$, 25$^b$, so that when said wheel is locked to the lifting member 25$^a$, the frame and the cultivator gangs connected therewith will be raised, as will be readily understood. The clutch mechanism will be controlled by a trip lever 26 and, in order to facilitate the manipulation of this lever by the operator, a rod 27 is connected at its rear end therewith and extends forwardly within convenient reach of the operator where it is provided with a finger-hold 28. The operating rod 27 is guided through a loop 29 at the free end of an arm or bracket 30 supported and projecting laterally from the standard portion 10 of the draw-bar 7.

Each unit of each gang includes a standard 31 pivotally connected at its upper end to the beam portion of the unit and carrying at its lower end a cultivator shovel or earth-working member 32. The standards for the rear gang units are pivoted as at 33 near the rear ends of said units while the standards 31 of the front gang units are pivoted as at 34 to intermediate portions of the beams of said units. Between the beam members of each rear gang unit, an approximately triangular lever 35 is pivotally mounted at the juncture of its several arms. The arm 36 of the lever 35 is connected with the pivoted standard 31 through the medium of companion links 37 and the arm 38 of said lever is connected by means of a link 39 with one end of a spring 40,—the latter being disposed under the beam of the unit and connected at its forward end to an arm 41 depending from said beam. When the parts are in working position the arm 42 of the lever 35 will serve as a stop to engage the upper edges of the companion links 37 which connect said lever with the pivoted standard 31, as shown in Figure 6.

The trip mechanism for the standards and shovels of the front gang is substantially the same as above described but the lever 35 is reversed and the spring 40 is located above instead of below the beam portion of the unit, as is also the link 39 and the arm 41, as illustrated in Figures 8, 9 and 10.

By arranging the spring tripping mechanism for the units of the respective front and rear gangs as above described, ample clearance between the front and rear gangs is obtained without in any way weakening the gangs.

To provide simple and efficient means for raising or lowering the frame of the cultivator sufficiently to effect adjustment of depth penetration of the earth-working members, the devices now to be explained may be employed:

Arms 43 are secured to and project above the standard 10 near the forward end of the frame and between these arms, a knuckle or sleeve 44 is pivotally connected for the free passage of a screw shaft 45, the threaded rear portion of which enters a tubular housing 46 having internal threads to receive it and the rear end of said housing is pivotally attached to an arm 47 secured to and projecting upwardly from the crank-axle 12. When the cultivator frame is raised to elevate the gangs, the arm 47, the screw housing 46 and the screw shaft 45 will move forwardly, the latter passing freely through the sleeve or knuckle 44, but when the parts are in their normal working positions rearward movement of the parts 45, 46 and 47 will be limited by a collar 48 secured to the screw shaft 45 and abutting against the sleeve or knuckle 44. The forward end of the screw shaft 45 is provided with a crank-handle 49 to facilitate the turning of said shaft. When the screw shaft 45 is turned in one direction, motion will be transmitted through the screw housing 46 and the arm 47 to the crank-axle 12 to turn the latter sufficiently to so raise the frame and cultivator gangs as to effect depth adjustment of the latter.

Having fully described my invention what I claim as new and desire to secure by Letters Patent, is:

1. In a cultivator, the combination with a frame, of two cultivator gangs, both connected with the forward portion of said frame, each gang unit including a beam portion and a standard portion pivoted to the beam portion, and spring tripping mechanism between the beam portion and the standard portion of each gang unit, the springs of the tripping mechanism for the rear gang units being located under the beam portions thereof and the springs of the front gang units being located above the beam portions thereof.

2. In a cultivator, the combination of a cultivator beam, a standard pivoted thereto and carrying an earth-working member, a lever pivoted to said beam and having three arms, a link connecting one of said arms with the pivoted standard, another of said arms constituting a stop to engage said link, a spring connected at one end to the beam, and a link connecting the other end of said spring with the third arm of said lever.

3. In a cultivator, the combination of a cultivator beam comprising two members, a standard pivoted at its upper end between said members and carrying an earth-working portion at its lower end, a lever having three arms pivotally mounted at the juncture of said arms between the members of the beam forwardly of the pivotal connection of the standard with the latter, companion links connecting one arm of said lever with said standard, another arm of said lever constituting a stop to engage the upper edges of said companion links, a spring connected at one end with the standard, and a link connecting the other end of said spring with the third arm of said lever.

In testimony whereof, I have signed this specification.

ARTHUR D. GALLAGHER.